US005486816A

United States Patent [19]

Ariga et al.

[11] Patent Number: 5,486,816

[45] Date of Patent: Jan. 23, 1996

[54] FIRE DETECTOR HAVING OPTIC BASE CLAMPING OPTIC ELEMENTS TO A CIRCUIT BOARD

[75] Inventors: Yasuo Ariga; Eiji Hirooka, both of Tokyo, Japan

[73] Assignee: Nohmi Bosai Ltd., Tokyo, Japan

[21] Appl. No.: 51,689

[22] Filed: Apr. 23, 1993

[30] Foreign Application Priority Data

Apr. 25, 1992 [JP] Japan .................................... 4-131536
Apr. 25, 1992 [JP] Japan .................................... 4-131537

[51] Int. Cl.[6] ............................ G08B 17/10; G08B 23/00; G08B 17/00; G01N 15/06

[52] U.S. Cl. .......................... 340/630; 340/693; 340/584; 250/574

[58] Field of Search .................................... 340/577, 584, 340/595, 630, 691, 693; 250/573, 574

[56] References Cited

U.S. PATENT DOCUMENTS

| | | | |
|---|---|---|---|
| 3,767,917 | 10/1973 | Lampart et al. | 250/83.6 FT |
| 4,396,840 | 8/1983 | Araki et al. | 250/381 |
| 4,539,556 | 9/1985 | Dederich et al. | 340/630 X |
| 4,584,485 | 4/1986 | Powers et al. | 250/574 |
| 4,672,217 | 6/1987 | Dobrzanski | 250/574 |
| 4,724,430 | 2/1988 | Igarashi | 340/693 |
| 4,786,811 | 11/1988 | Sasaki | 250/385.1 |
| 4,851,819 | 7/1989 | Kawai et al. | 340/630 |
| 4,897,634 | 1/1990 | Sawa et al. | 340/630 |
| 4,929,093 | 5/1990 | Suzuki et al. | 340/693 X |
| 5,021,677 | 6/1991 | Igarashi et al. | 340/630 X |

FOREIGN PATENT DOCUMENTS

| | | | |
|---|---|---|---|
| 0233294 | 8/1987 | European Pat. Off. | G08B 17/10 |
| 0233754 | 8/1987 | European Pat. Off. | G08B 17/10 |
| 2609172 | 7/1988 | France | G01N 21/49 |
| 2434178 | 1/1976 | Germany | G08B 17/10 |
| 430507 | 8/1967 | Switzerland | G08B 17/06 |

*Primary Examiner*—Victor R. Kostak
*Assistant Examiner*—John W. Miller
*Attorney, Agent, or Firm*—Wenderoth, Lind & Ponack

[57] ABSTRACT

A photoelectric type fire detector has: a detector body; a printed circuit board disposed on the upper side of the detector body; conductive connecting members provided on the lower side of the detector body; terminal screws for simultaneously fixing the printed circuit board and the conductive connecting members to the detector body; an optic base directly placed on the upper side of the printed circuit board and having a labyrinth formed on the upper side thereof; hooks for fixing the optic base to the upper side of the printed circuit board; a light-emitting element and a light-receiving element arranged in a pair for detecting smoke; a bug screen provided on the outer periphery of the labyrinth of the optic base; an optic base cover covering the upper side of the optic base; and a protective cover covering the printed circuit board, the optic base, the bug screen and the optic base cover. The protective cover has a plurality of smoke inlet windows and is provided with hooks on the lower end thereof, the hooks engaging the detector body to fix the protective cover to the upper side of the detector body. The invention is also applicable to a heat-photoelectric type fire detector in which a heat sensing element connected to the printed circuit board is combined with the photoelectric fire detecting function. The heat sensing element is securely fixed by a protective cover of the device.

23 Claims, 14 Drawing Sheets

FIRE DETECTOR HAVING OPTIC BASE CLAMPING OPTIC ELEMENTS TO A CIRCUIT BOARD

BACKGROUND OF THE INVENTION

1. Field of the Invention

The present invention relates to a fire detector and, more particularly, to a photoelectric type of fire detector capable of photoelectrically detecting smoke generated as a result of a fire, as well as to a heat-photoelectric type of fire detector which detects presence of fire by sensing both heat and smoke generated by the fire.

2. Description of the Related Art

A photoelectric type of smoke detector is known from, for example, the disclosure of Japanese Patent Publication No. 63-34520. This device has a housing composed of a detector body and a cover fitting on the body. A printed circuit board is provided on the bottom of the body. An optic base is disposed in an opening formed in the upper side of the housing. The optic base carries a light-emitting element and a light-receiving element arranged such that the optical axes of these elements are nearly parallel with the optic base. A top plate with a labyrinth is placed through the opening in the upper side of the housing so as to cover the optic base. The outer peripheral surface of the top plate is covered with a bug screen.

Assembling and disassembling this known smoke detector requires a great deal of work that is time-consuming due to the use of many screws as fixing means. The optic base in the opening of the housing is held by an L-shaped support member so as to be spaced from the printed circuit board in order to protect electric circuit parts. Consequently, the height of the housing is increased by the height of the L-shaped support member. The thickness of the detector could be reduced by reducing the height of a dark box which is formed on the optic base. This solution, however, may lead to impairment of the performance of the detector. Therefore, the dark box is inevitably designed to have an ordinary height, and the overall thickness of the smoke detector is increased accordingly.

Fixing the L-shaped support member to the printed circuit board also is troublesome. In addition, the support member tends to be deformed, which makes it difficult to fix the optic base at a preselected distance from the printed circuit board. Displacement of the optic base may cause a misalignment of optical axis between the light emitting element and the light receiving element.

In general, a photoelectric type of smoke detector employs a shield case made of, for example, an iron sheet which electrostatically and electromagnetically shields the light receiving element in order to prevent erroneous operation attributable to noise induced by electromagnetic waves or the like. The use of such a shield case, however, increases noise light components because the light emitted from the light-emitting element, as well as the light reflected by the inner surface of the dark box, impinges upon and is reflected by the shield case, thus impairing precision of detection. In order to overcome these problems, the shield case is usually painted black.

The use of a shield case painted black poses the following problems.

A: The shield case is to be soldered to the printed circuit board directly at its legs or indirectly through lead wires. Therefore, the portions where the soldering is done should be left unpainted or, alternatively, the paint on these portions should be removed before soldering. Effecting either of such techniques is troublesome.

B: Assembling the detector requires the greatest care so as not to damage the shield case by, for example, an assembly tool; otherwise, the noise light components increase due to scattering of light by the damaged portion of the shield case where the paint is removed.

C: Dust accumulated in the dark box is to be removed in periodical inspection of the smoke detector. This essentially requires detaching and attaching a lid of the dark box. The cleaning work must be done with the greatest care so as not to damage the paint on the shield case by the lid or a cleaning tool.

In general, a known smoke detector employs, as the light-emitting element, a so-called bullet type of diode having a substantially hemispherical top portion and a pair of lead terminals extending downward from the lower end. This type of diode emits light such as infrared light rays upward or forward from the hemispherical top portion. This type of light-emitting diode is laid in the smoke detector in such a manner as to emit the light substantially parallel with the bottom wall of the dark box or at a certain angle thereto. This essentially requires that the lead terminals of the diode are bent at a certain angle. Consequently, the assembling of this known smoke detector requires a task of bending the lead terminals of the light emitting diode at a certain angle. In addition, an excessive force might possibly be applied to the main part of the diode, when bending the terminals, and cause the diode to be destroyed.

Practically, it is difficult to bend the lead terminals of all light-emitting diodes precisely at the same angle. In other words, the bending angle varies with each individual diode. Such variation in the bending angle causes an offset of the mounting height of the diode when the lead terminals are soldered to the printed circuit board. This leads to misalignment of the optical axis of the light-emitting diode with that of the light-receiving element, impairing the precision of smoke detection.

Attempts have been made to obviate the variation in the mounting height of the light emitting diode, such as to insert and fix the light-emitting diode in a diode holding portion provided in the dark box, or to fix the diode on the diode holding portion by means of a retainer plate. Such fixing methods, however, are not recommended because the light-emitting diode could be destroyed or the life of the same shortened due to forces applied to the lead terminals during the fixing.

In general, it is not possible to bend the lead terminals at their base ends. Consequently, the overall length of the light-emitting diode in the state of use is increased, which undesirably impedes reduction in the diameter of the dark box, making it difficult to design and produce a compact smoke detector.

A heat-photoelectric type of fire detector is also known in which the above-described smoke detecting function is combined with a fire detecting function of sensing to heat. This combined type of fire detector employs a heat sensing element projecting to the outside of the housing through an opening in the cover. The lead wires of the heat sensing element are fixed to the top plate having the labyrinth by means of an adhesive tape.

In this type of fire detector, it has been difficult to precisely locate and fix the heat sensing element at a predetermined position, due to the use of the adhesive tape for fixing the lead wires. In addition, the heat sensing element, even when placed at the predetermined position, tends to be shifted if the lead wires are pulled, thus impairing precision of the fire detection.

SUMMARY OF THE INVENTION

Accordingly, an object of the present invention is to provide a photoelectric type of fire detector or a heat-photoelectric type of fire detector, which is thin and easy to assemble and disassemble, thereby overcoming the above-described problems of the prior art.

Another object of the present invention is to provide a photoelectric type of fire detector in which an optic base can be securely and easily fixed to a printed circuit board.

A further object of the present invention is to provide a photoelectric type of fire detector which prevents misalignment of optical axes of the light-emitting element and the light-receiving element.

A still further object of the present invention to provide a photoelectric type of fire detector having a shield which can shield the light-receiving element without impairing its smoke detecting function.

A still further object of the present invention to provide a photoelectric type of fire detector which does not necessitate a bending of the lead terminals of the light-emitting element.

A still further object of the present invention is to provide a heat-photoelectric type of fire detector which allows easy fixing of a heat sensing element at a desired location.

To these ends, according to a first aspect of the present invention, there is provided a photoelectric type of fire detector, comprising: a detector body; a printed circuit board disposed on the upper side of the detector body; conductive connecting members provided on the lower side of the detector body; terminal screws for simultaneously fixing the printed circuit board and the conductive connecting members to the detector body; an optic base directly placed on the upper side of the printed circuit board and having a labyrinth formed on the upper side thereof; fixing means for fixing the optic base to the upper side of the printed circuit board; a light-emitting element and a light-receiving element arranged in a pair for detecting smoke; a bug screen provided on the outer periphery of the labyrinth of the optic base; an optic base cover covering the upper side of the optic base; and a protective cover covering the printed circuit board, the optic base, the bug screen and the optic base cover, the protective cover having a plurality of smoke inlet windows and provided with hooks formed on the lower end thereof, the hooks engaging the detector body and thereby fixing the protective cover to the upper side of the detector body.

According to a second aspect of the present invention, there is provided a photoelectric type of fire detector, comprising: a printed circuit board having a plurality of insertion holes; an optic base having a plurality of hooks formed on the lower end thereof and having also an annular labyrinth formed on an upper portion thereof, the hooks being received in the insertion holes in the printed circuit board so as to fix the optic base to the upper surface of the printed circuit board; an optic part holder clamped between the optic base and the printed circuit board; and a light-emitting element and a light-receiving element arranged in a pair on the optic part holder.

According to a third aspect of the present invention, there is provided a photoelectric type of fire detector, comprising: a detector body; an optic base directly fixed to the printed circuit board and having an annular labyrinth formed on the periphery thereof; an optic base cover for covering the upper side of said labyrinth of the optic base and thereby forming a dark box; and a light-emitting element and a light-receiving element arranged in a pair in the dark box such that the optical axes of the elements intersect each other.

According to a fourth aspect of the present invention, there is provided a photoelectric type of fire detector, comprising: a printed circuit board; a dark box formed on the printed circuit board; a light-emitting element and a light-receiving element arranged in a pair within the dark box; a shield case covering the light-receiving element; and a light interrupting wall formed in the dark box and concealing the shield case.

According to a fifth aspect of the present invention, there is provided a photoelectric type of fire detector, comprising: a dark box having a light-emitting element receiving portion and a light-receiving element receiving portion formed therein; a side-emission type light-emitting element received in the light-emitting element receiving portion; and a light-receiving element received in the light-receiving element receiving portion.

According to a sixth aspect of the present invention, there is provided a heat-photoelectric type of fire detector, comprising: a detector body; a printed circuit board disposed on the upper side of the detector body; conductive connecting members provided on the lower side of the detector body; terminal screws for simultaneously fixing the printed circuit board and the conductive connecting members to the detector body; an optic base directly placed on the upper side of the printed circuit board and having a labyrinth formed on the upper side thereof; fixing means for fixing the optic base to the upper side of the printed circuit board; a light-emitting element and a light-receiving element arranged in a pair for detecting smoke; a bug screen provided on the outer periphery of the labyrinth of the optic base; an optic base cover covering the upper side of the optic base and having a holder receiving portion formed in the upper side thereof; a heat sensing element having lead lines connected to the printed circuit board; a heat sensing element holder holding the heat sensing element and fittingly received in the holder receiving portion of the optic base cover; and a protective cover covering the printed circuit board, the optic base, the bug screen and the optic base cover, the protective cover having a plurality of smoke inlet windows and provided with hooks formed on the lower end thereof, the hooks engaging the detector body and thereby fixing the protective cover to the upper side of the detector body, the protective cover further having an insertion hole formed in an upper portion thereof such that the heat sensing element protrudes upright through the insertion hole.

According to a seventh aspect of the present invention, there is provided a heat-photoelectric type of fire detector, comprising: a printed circuit board; a dark box formed on the printed circuit board; a light-emitting element and a light-receiving element arranged in a pair in the dark box; a holder receiving portion formed in the central portion of the upper side of the dark box and having a plurality of locating recesses; a heat sensing element holder having a plurality of projections received in the locating recesses in the holder receiving portion, the holder being received in the holder receiving portion; a heat sensing element held upright on the holder and having lead lines connected to the printed circuit board; and a protective cover having an insertion hole formed in an upper portion thereof and covering the upper side of the printed circuit board and the dark box, such that the heat sensing element projects through the insertion hole.

These and other objects, features and advantages of the present invention will become clearer from the following description of the preferred embodiments when the same is read in conjunction with the accompanying drawings.

DETAILED DESCRIPTION OF THE PREFERRED EMBODIMENTS

First Embodiment

Figure 1:
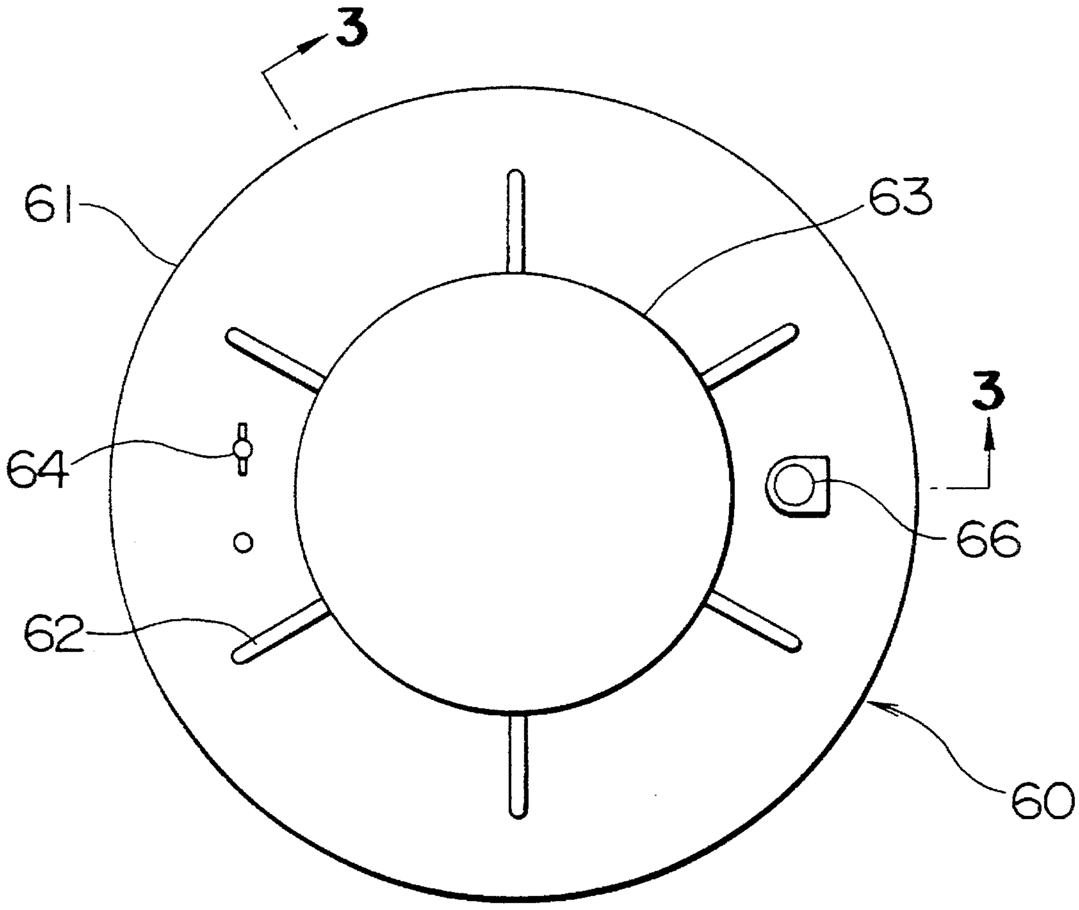
FIGS. 1 and 2 are a plan view and a bottom plan view, respectively, of a photoelectric type fire detector constituting a first embodiment of the present invention.
Figure 2:
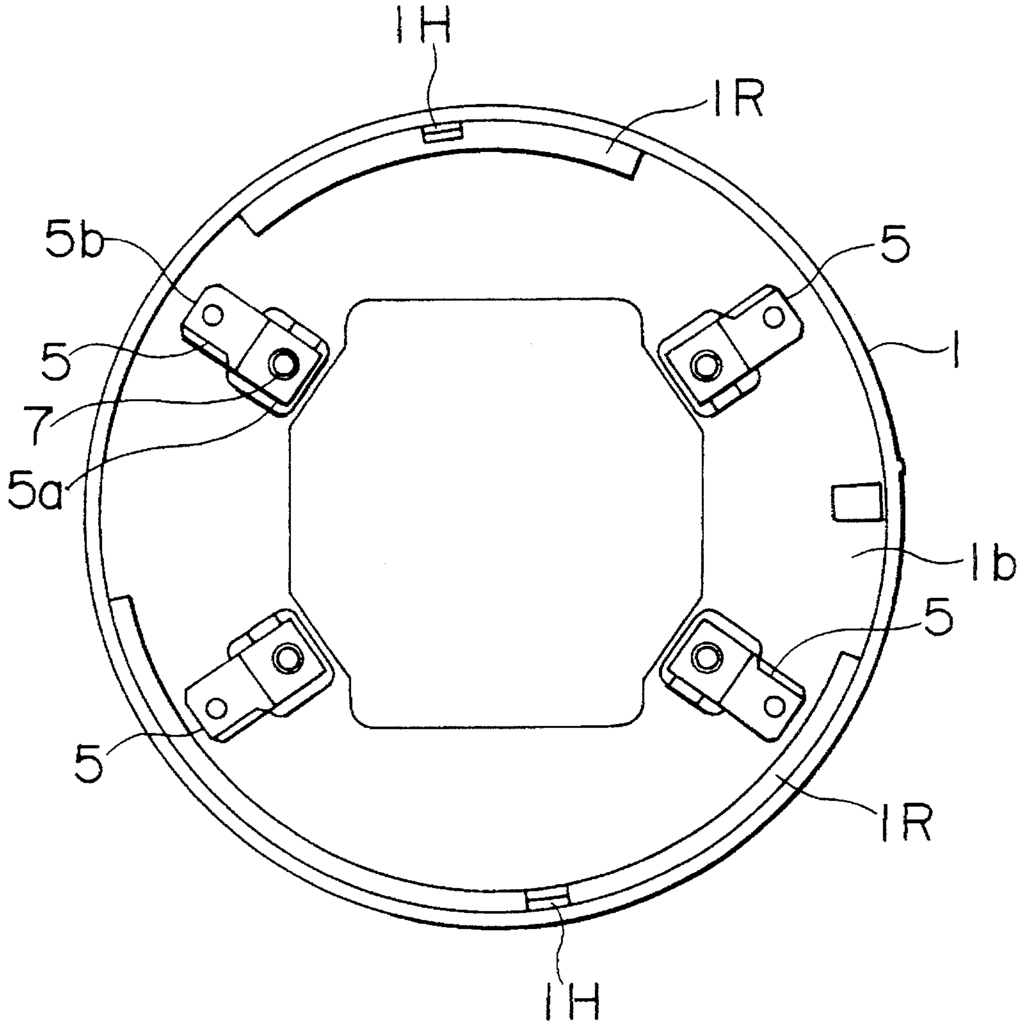
Figure 3:
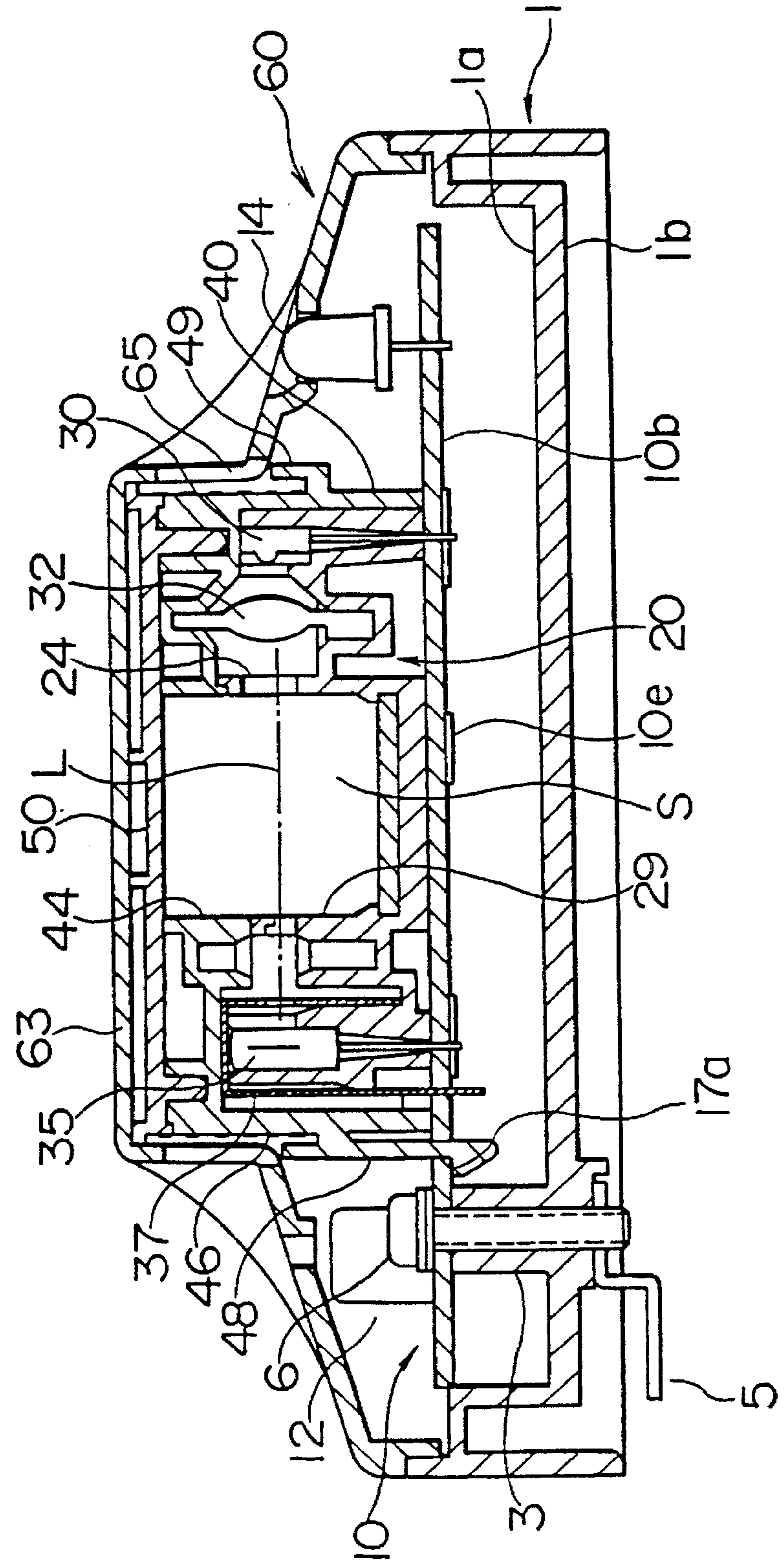
FIG. 3 is a sectional view taken along the line 3—3 of FIG. 1.

Referring to FIGS. 1 and 2, a photoelectric type of fire detector as the first embodiment of the present invention has a detector body 1 and a protective cover 60 which covers the upper side of the body 1. As shown in FIG. 3, a plurality of metal blade members 5 serving as conductive joints are attached to a lower surface 1*b* of the body 1, and a printed circuit board 10 is mounted on an upper surface 1*a* of the body 1. The printed circuit board 10 and the metal blade members 5 are fixed to the body 1 by means of common terminal screws 6. An optic part holder 20, an optic base 40 and an optic base cover 50 are secured to the upper surface of the printed circuit board 10. The optic part holder 20 holds an LED 30 as a light-emitting element, a lens 32, a photodiode 35 as the light-receiving element, and a shield case 37 which shields the photodiode 35. A bug screen 46 is arranged in such a way as to surround the outer periphery of the optic base 40.

Figure 4:
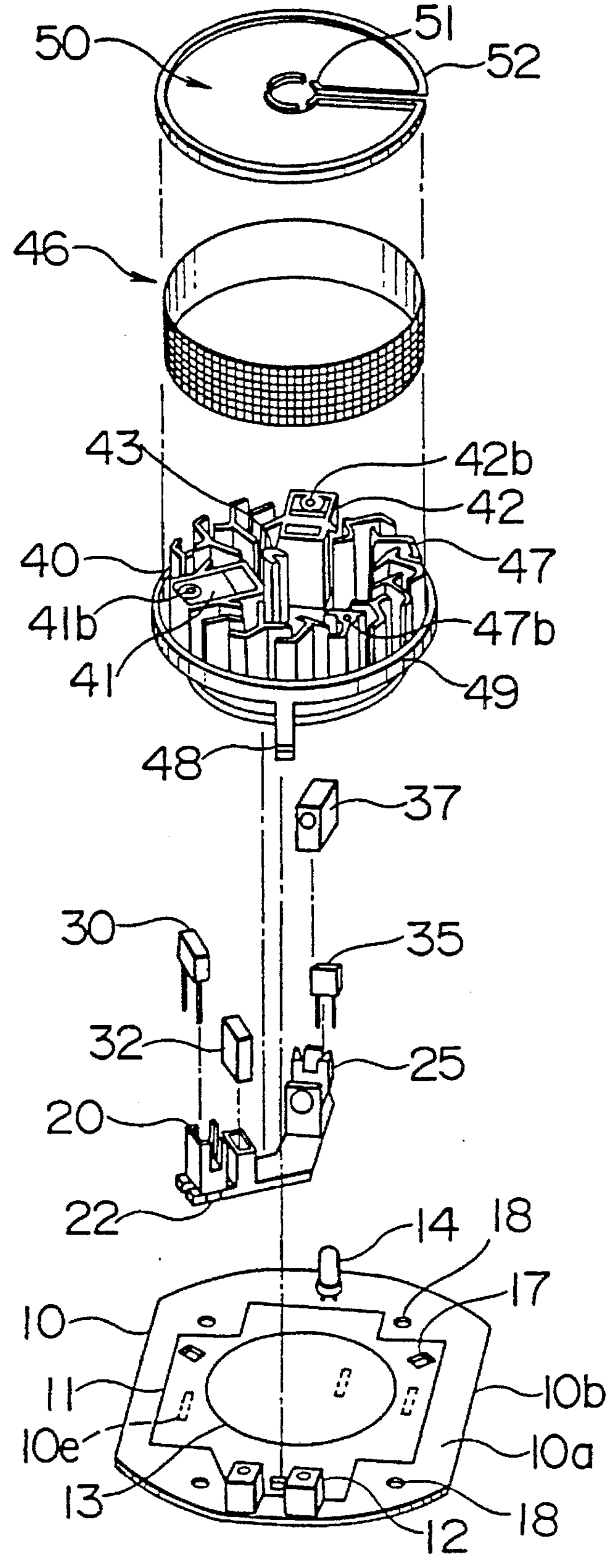
FIG. 4 is an assembly diagram showing a printed circuit board, an optic part holder, an optic base, an optic base cover, a bug screen, a light-emitting element and a light-receiving element of the first embodiment.

The photoelectric type of fire detector of the first embodiment is assembled in the following manner. As shown in FIG. 4, the LED 30, lens 32, photodiode 35 and the shield case 37 are mounted on the optic part holder 20, and the optic part holder 20 carrying these components is inserted into a cavity formed in the bottom of the optic base 40. The optic base 40 is then secured to the printed circuit board 10.

Figure 5:
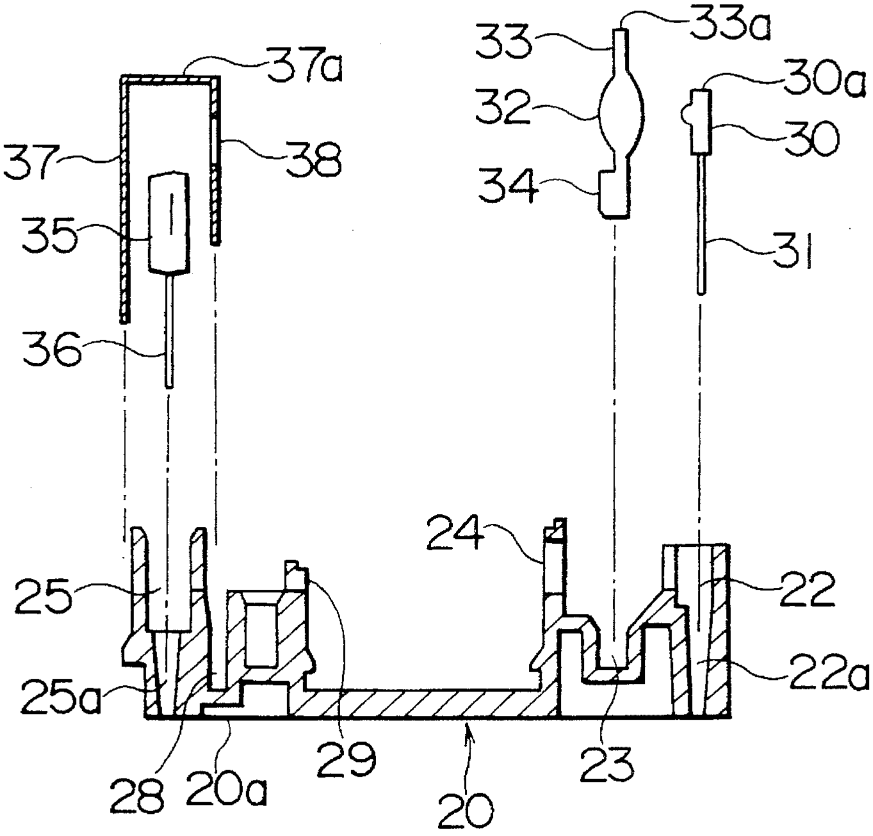
FIG. 5 is an assembly diagram of an optic part holder.

The optic part holder 20 has a substantially L-like form, and is provided at its one end with a light-emitting element receiving portion 22, a lens receiving portion 23 and a light-emitting window 24 which are arranged in the foregoing order from the peripheral part towards the center, as will be seen from FIG. 5. The other end of the holder 20 has, from the peripheral end toward the center, a light-receiving element receiving portion 25, a shield case receiving portion 28 and a lower light shielding wall 29 having a light-receiving window. Vertical insertion holes 22*a* and 25*a* are formed in the bottom of the light-emitting element receiving portion 22 and the light-receiving element receiving portion 25, in communication with the spaces inside these receiving portions 22 and 25. The holder 20 has a flat bottom surface 20*a*. The receiving portions 22 and 25 are open at their upper sides so as to receive the light-emitting element 30 and the light-receiving element 35 inserted from the upper side.

The LED 30 is of a so-called side emitting type which has an optical axis perpendicular to the element axis, and is provided at its lower portion with vertical lead terminals 31. The use of this type of element eliminates the necessity of bending the lead terminals, thus facilitating the mounting work. The lens 32 is provided at its upper and lower portions with supporting portions 33 and 34. The photodiode 35 also has an optical axis perpendicular to the diode axis, and is provided at its lower end with vertical lead terminals 36. The shield case 37, which is not painted, is provided in the front wall thereof with a light-receiving window 38. The upper ends of the light-emitting element 30, lens supporting portion 33 and the shield case 37 constitute contact portions 30*a*, 33*a* and 37*a* at which these elements are pressed onto the optic base 40.

Figure 6:
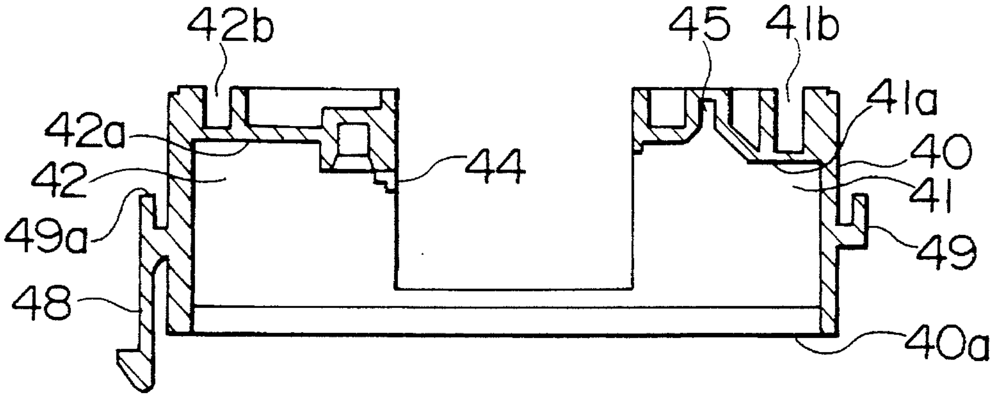
FIGS. 6, 7 and 8 are a sectional view, a plan view and a bottom plan view of the optic base, respectively.
Figure 7:
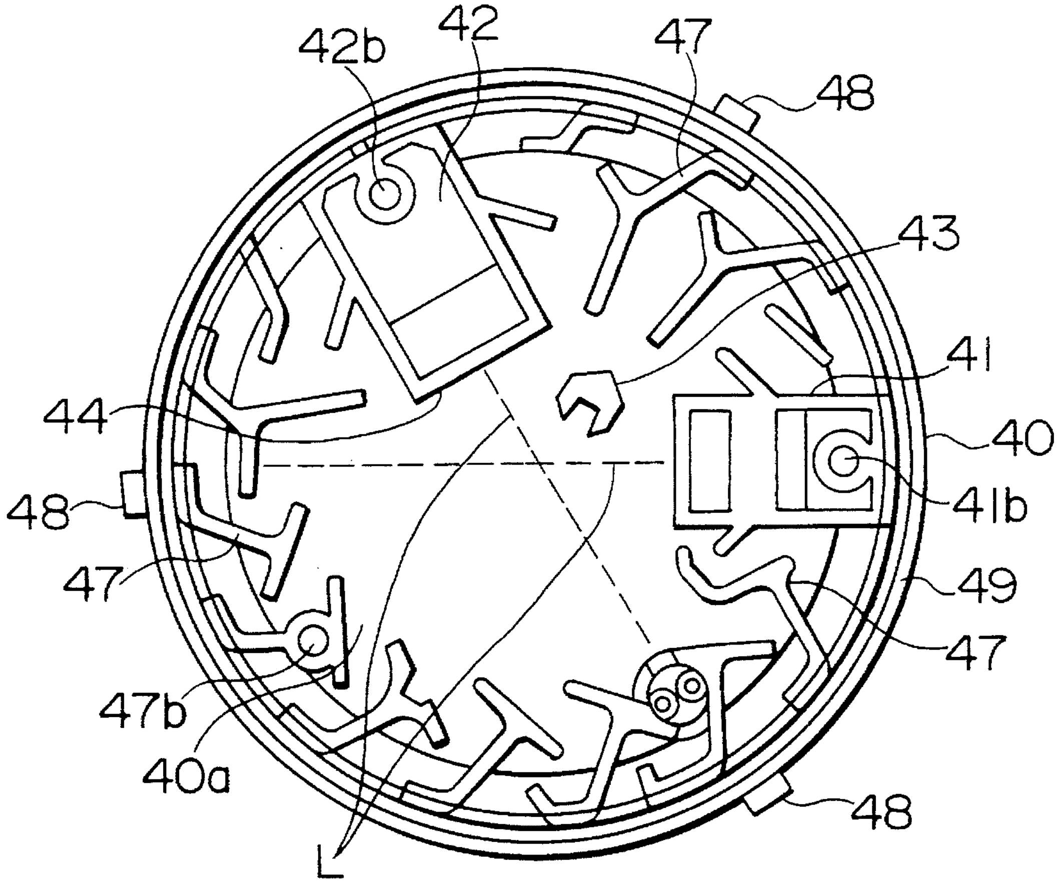
Figure 8:
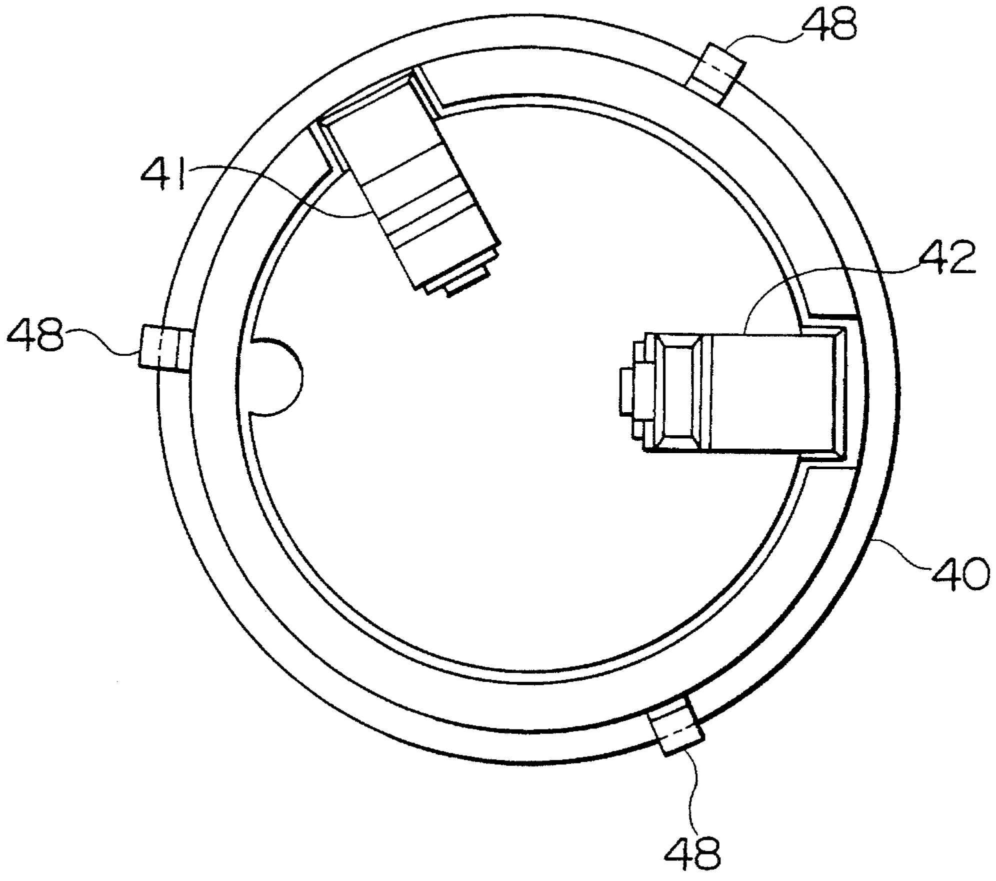

The optic base 40 has a structure as shown in FIGS. 6 to 8. A light-emitting section receiving portion 41 open at its lower end, a light-receiving section receiving portion 42 which also is open at its lower end and a light interrupting pillar 43 are provided in and on the bottom surface 40*a* of the optic base 40. Both receiving portions 41 and 42 are formed in alignment with the corresponding receiving portions in the optic part holder 20. The inner surface of the light-emitting section receiving portion 41 has a contact portion 41*a* which contacts the light-emitting element 30 and a groove 45 which receives the lens 32 with a press fit. The inner surface of the light-receiving section receiving portion 42 has an upper light interrupting wall 44 which contacts a lower light interrupting wall 29 of the holder 20, and a contact portion 42*a* which makes pressure contact with the shield case 37. Labyrinth members 47 are annularly arranged on the bottom surface 40*a* of the optic base 40 so as to sandwich each of the light-emitting section receiving portion 41 and the light-receiving section receiving portion 42. The bug screen 46 is provided over the outer periphery of the labyrinth members 47 and held by an annular wall 49. The annular wall 49 is provided on the outer side of the optic base 40, and the upper end 49*a* of the annular wall 49 is located at a lower portion of the labyrinth members 47. Three hooks 48, which are spaced in the circumferential direction, are provided on the outer wall of the optic base 40.

The upper surface 10*a* of the printed circuit board 10 has a cross-shaped shield portion 11 having a large area, check terminals 12, an optic base mounting portion 13 formed on the shield portion 11 and an indicator lamp 14. Electric circuit parts 10*e* are mounted to the lower surface 10*b* of the printed circuit board 10. Holes 17 for receiving the hooks 48 of the optic base 40 are formed in the printed circuit board 10. Retaining portions 17*a* for engaging the hooks 48 are formed at the periphery of the insertion holes 17 on the lower surface 10*b* of the printed circuit board 10.

In assembling the fire detector, the side-emitting type of light-emitting element 30 is received in the light-emitting element receiving portion 22, with the lead terminals 31 inserted into the insertion hole 22*a* formed in the optic part holder 20, and the supporting portion 34 of the lens 32 is placed in the lens receiving portion 23. In this state, the light-emitting element 30 and its lead terminals 31 are held vertically. Then, the light-receiving element 35 is placed in the light-receiving element receiving portion 25, with the lead terminals 36 inserted into the insertion hole 25*a*. In this state, the light-receiving element 35 and the lead terminals 36 are held vertically. Then, the shield case 37 is fitted in the shield case receiving portion 28 so as to cover and shield the light-receiving element 35.

Subsequently, as shown in FIG. 4, the hooks 48 of the optic base 40 are inserted into the insertion holes 17 in the printed circuit board 10 and are engaged with retaining portions 17*a*. Consequently, the optic base 40 is held in direct contact with the printed circuit board 10 at its bottom surface 40*a*, while being centered by the three hooks 48. Thus, the optic part holder 20 is clamped between the optic base 40 and the printed circuit board 10, while the optic base 40 is correctly located on the optic base mount portion 13.

In this state, the contact portions 30*a*, 33*a* and 37*a* of the light-emitting element 30, the supporting portion 33 of the lens 32 and the shield case 37 on the optic part holder 20 are pressed by the respective contact portions 41*a*, the surface defining groove 45 and contact portion 42*a* of the optic base 40, so that these elements are correctly located and rigidly held in position even if subjected to any force such as vibration. Thus, the common optical axis L of the light-emitting element 30 and the light-receiving element 35 is accurately held parallel with the bottom surface 40*a* of the optical base 40. The optical axis L is positioned substantially at the same level as the upper end 49*a* of the annular wall 49.

Subsequently, the bug screen 46 is placed on the outer peripheral surface of the labyrinth members 47 of the optic base 40 so as to be held by the annular wall 49. Then, the optic base cover 50 is attached to the upper side of the optic base 40.

Figure 9:
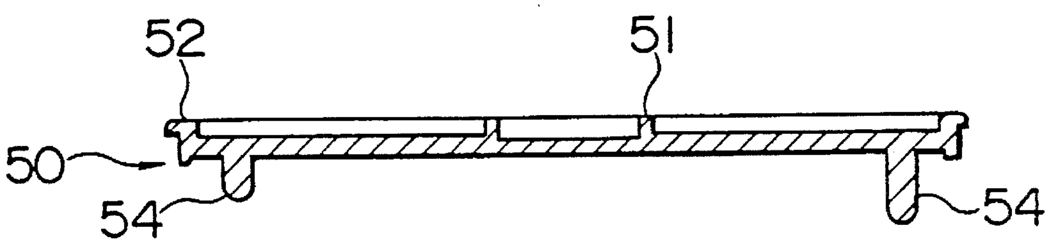
FIG. 9 is a sectional view of the optic base cover.

The structure of the optic base cover 50 will be described with reference to FIG. 9. As will be seen from this Figure, a central cylindrical protrusion or wall 51 and a peripheral protrusion or wall 52 are formed on the upper surface of the cover 50, while a plurality of projections 54 are formed on the lower surface of the same. When the cover 50 is attached to the labyrinth members 47, the projections 54 of the cover 50 are fitted in associated holes 47*b*, 41*b* and 42*b* formed on the upper surface of one labyrinth member 47, the light-emitting section receiving portion 41 and the light-receiving section receiving portion 42, respectively.

As a result, the interior of the space confined by the optic base 40 and the cover 50 is darkened, thus forming a so-called dark box. In this state, the shield case 37 is not exposed to the smoke supervising space S because it is surrounded by the light-receiving section receiving portion 42 and the upper light interrupting wall 44 of the optic base 40 and by the lower light interrupting wall 29 of the optic part holder 20. Therefore, the light scattered in the dark box is never reflected by the shield case 37, even if the latter is not painted. According to the described arrangement, a sufficiently large distance can be preserved between the upper and lower inner surfaces of the dark box, and the height of the top surface of the dark box from the lower surface of the detector body 1 can be decreased.

Figure 10:
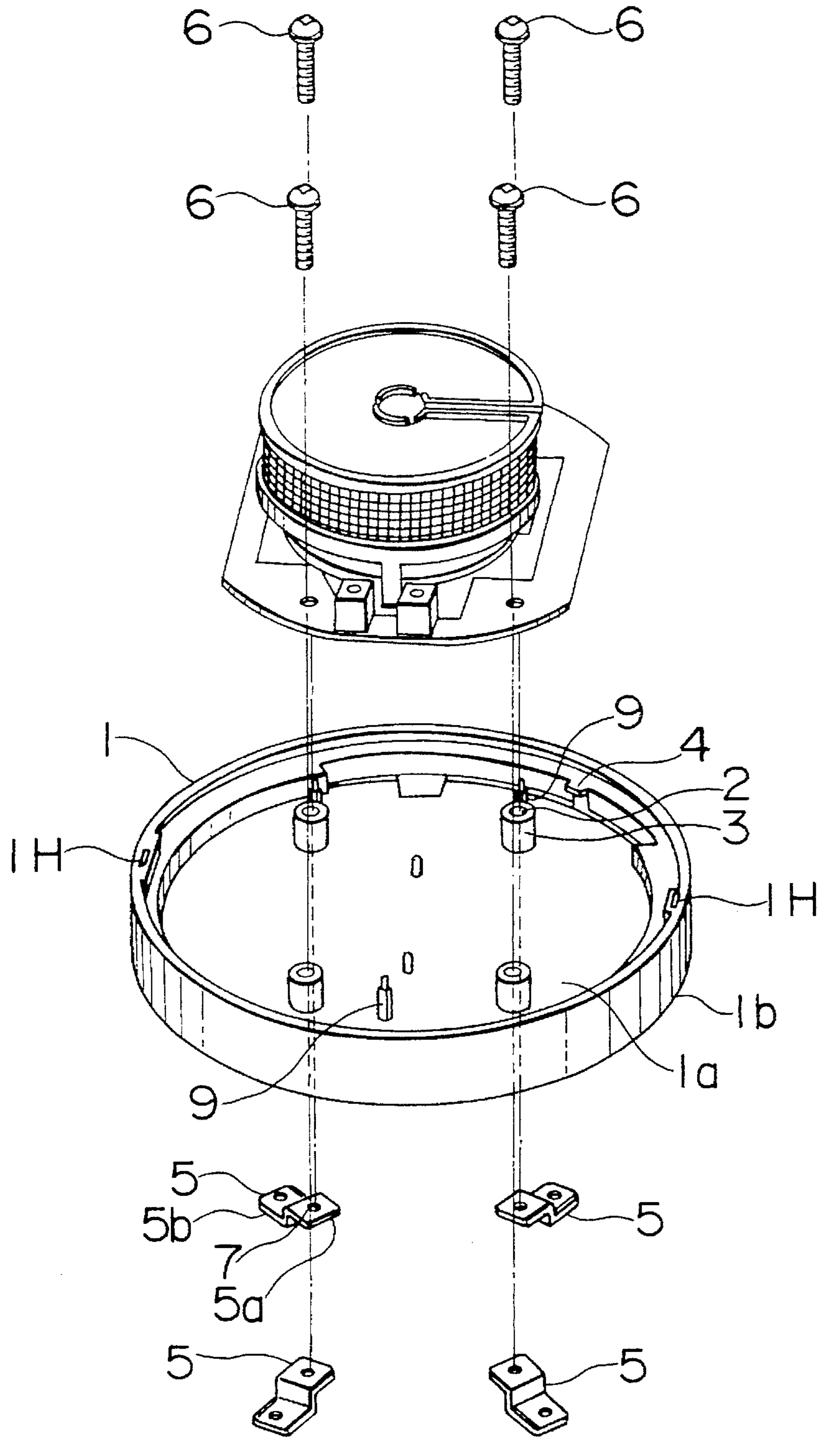
FIG. 10 is an assembly diagram showing a detector body, printed circuit board and so forth.

Then, as shown in FIG. 10, the printed circuit board 10 and the four metal blade members 5 are secured to the body 1 by means of four terminal screws 6. Four supporting pillars 3 having insertion holes 2, as well as a locating projection 9 for locating the printed circuit board 10, are formed on the upper surface 1*a* of the body 1. Retaining portions 4 are provided in the outer periphery of the body 1. As shown in FIG. 2, a water drainage annular groove 1R is formed in the lower surface 1*b* of the body 1, in communication with a drainage hole 1H which is formed in the outer peripheral edge of the body 1. The metal blade members 5 serving as conductive joints shown in FIG. 10 are fixed on the lower surface 1*b* of the body 1. Each metal blade member 5 has a fixing portion 5*a* and a blade portion 5*b*. The fixing portion 5*a* is provided with a threaded hole 7 for threaded engagement with the terminal screw 6. The blade portion 5*b* is adapted to be engaged with a conductive mating blade member provided on a detector base which is not shown.

The printed circuit board 10 is placed in contact with the top ends of the supporting pillars 3, with the projection 9 received in a hole formed in the printed circuit board 10. Then, the terminal screws 6 are inserted into the holes 2 and 18. Then, the fixing portions 5*a* of the metal blade members 5 are brought into contact with the lower surface 1*b* of the body 1, and the terminal screws 6 are tightened, whereby the printed circuit board 10 is fixed.

Figure 11:
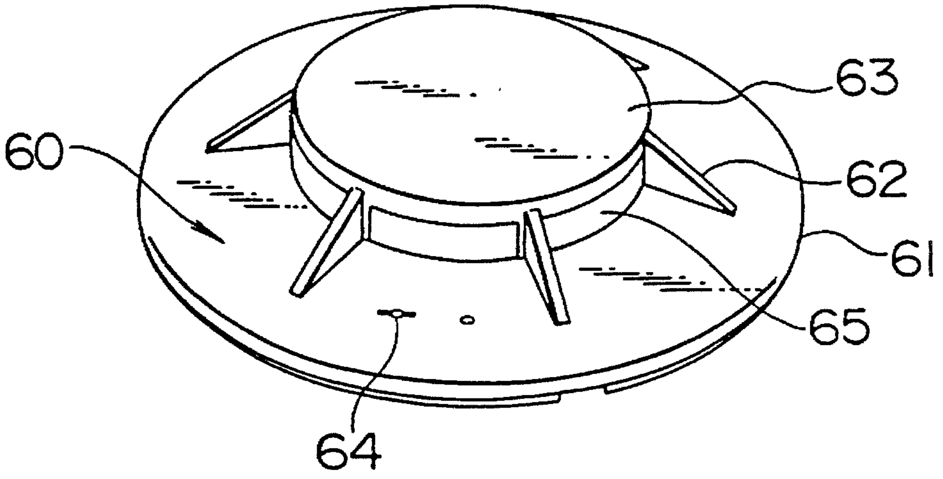
FIG. 11 is a perspective view of a protective cover used in the first embodiment.

Then, the protective cover 60 as shown in FIG. 11 or FIG. 1 is fixed to the body 1. The protective cover 60 has a flange portion 61 and a top plate 63 which are connected to each other through connecting stays 62. A check bar insertion hole 64 and an indicator lamp hole 66 are formed in the flange portion 61, and a plurality of smoke inlet windows 65 are provided between the flange portion 61 and the top panel 63. Hooks are provided on the outer peripheral edge of the flange portion 61 for engagement with the retaining portions 4 formed on the body 1.

The protective cover 60 is fixed to the body 1 with the hooks in engagement with the retaining portions 4 of the body 1. The indicator lamp hole 66 receives the indicator lamp 14 which is provided on the printed circuit board 10.

The first embodiment is only illustrative of the present invention. For instance, the lower surface 40*a* of the optic base 40 may be provided with an annular ring which is adapted to be held in contact with the printed circuit board 10, instead of the lower surface 40*a* being in direct contact with the printed circuit board 10 as in the described embodiment. Alternatively, a plurality of circumferentially spaced projections, e.g., three projections, may be provided instead of the annular ring. The check terminals 12 may be formed by a print pattern on the printed circuit board 10. The check bar insertion hole 64 formed in the protective cover 60 may be omitted. The mating blade members may be provided on the body 1 as the conductive joints, and metal blade members, similar to those designated by reference numeral 5, may be provided on the detector base.

The first embodiment offers an advantage over the known devices in that the assembling and disassembling of the detecting device can be done easily because of the reduced number of fixing screws. In addition, since the optic base is directly fixed to the printed circuit board by engaging means, it is possible to reduce the thickness of the detector while maintaining a sufficient height of the dark box. It is thus possible to reduce the thickness of the detector without any adverse effect on its performance.

Second Embodiment

Figure 12:
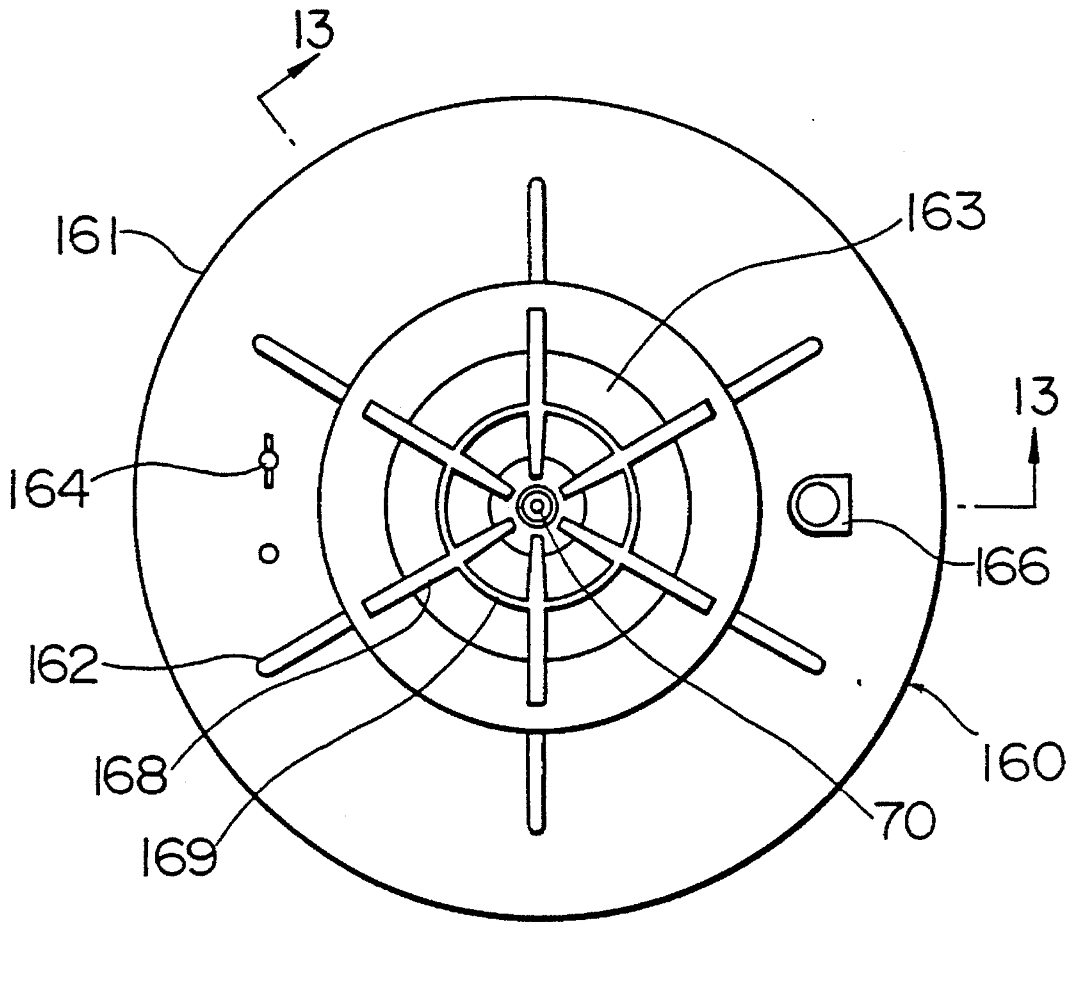
FIG. 12 is a plan view of a heat-photoelectric type fire detector constituting a second embodiment of the present invention.
Figure 13:
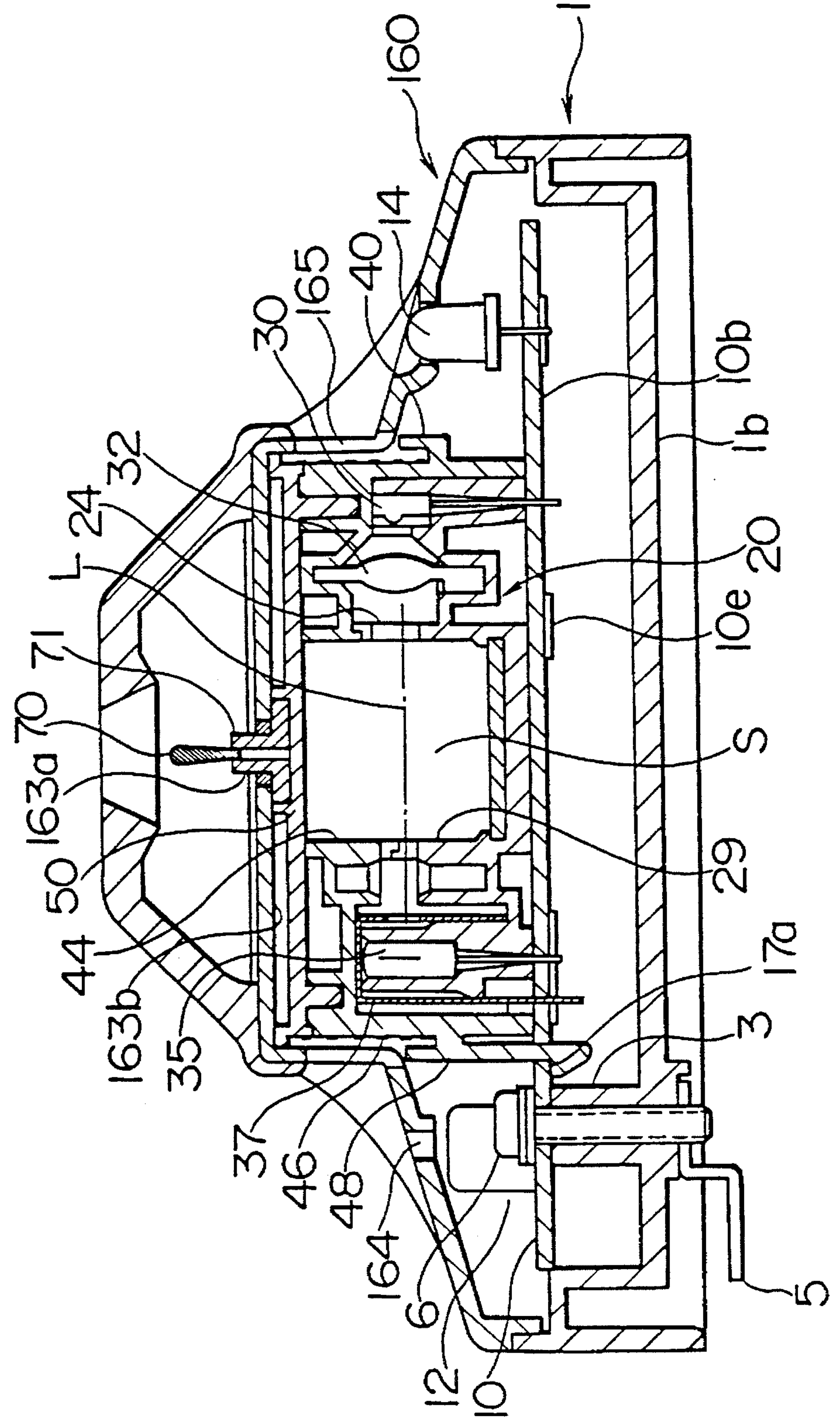
FIG. 13 is a sectional view taken along the line 13—13 of FIG. 12.

FIGS. 12 and 13 are a plan view and a sectional view of a heat-photoelectric type of fire detector which is a second embodiment of the present invention. The second embodiment is similar to the first embodiment but is different from the latter in that a heat sensing element 70 is provided on the optic base cover 50 and a protective cover 161 is used in place of the protective cover 60 used in tile first embodiment. Other components are substantially the same as those in the first embodiment and, therefore, are denoted by the same reference numerals as those in the first embodiment.

Figure 14:
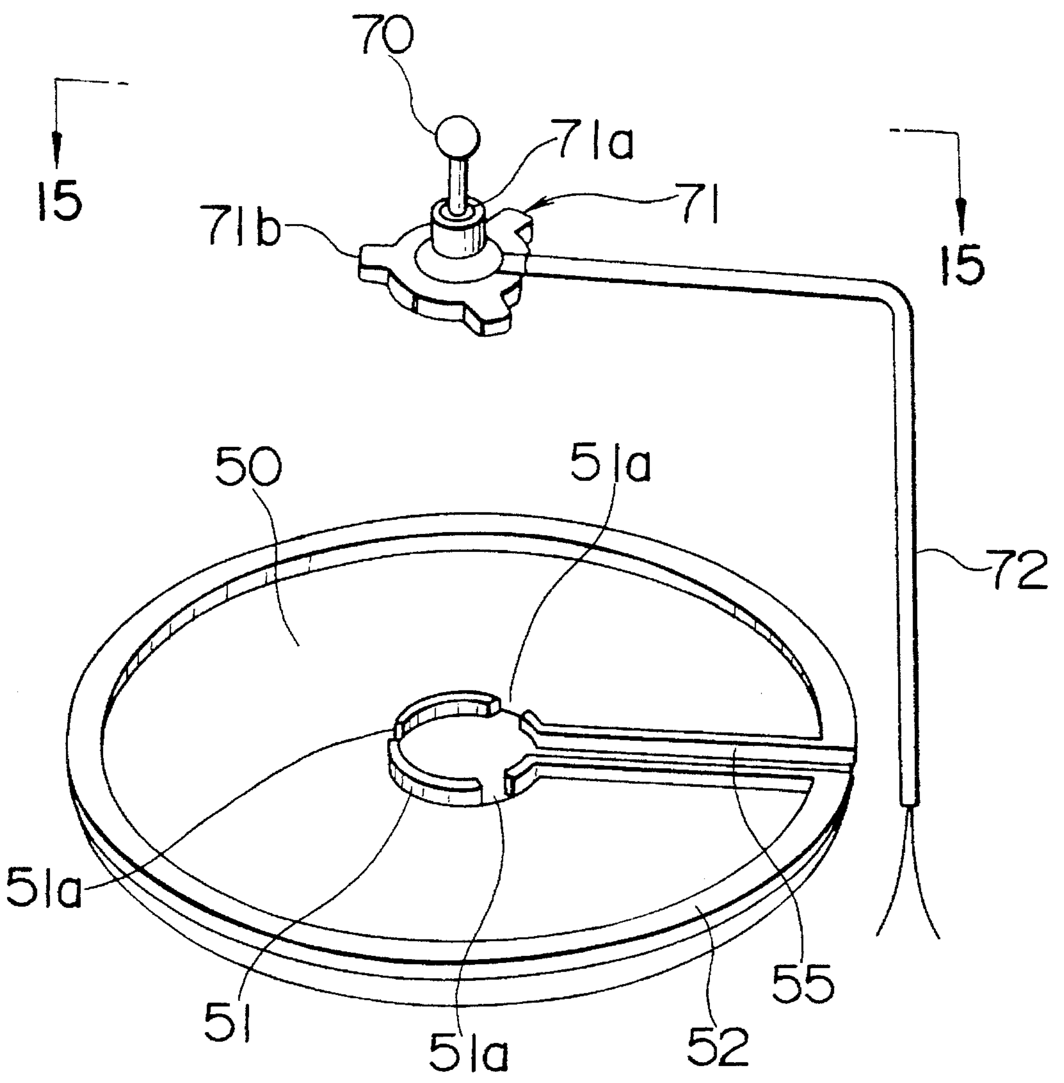
FIG. 14 is a perspective view of the second embodiment illustrating the manner in which the heat sensing element is mounted.

Referring to FIG. 14, the upper surface of the optic base cover 50 has a holder receiving portion 51 for holding the heat sensing element 70, a lead wire guide groove 55 and a cylindrical portion 52. The holder receiving portion 51 has a cylindrical form, and three locating recesses 51*a* are formed in the holder receiving portion 51 at an equal circumferential spacing. The cylindrical portion 52 is provided on the outer peripheral edge of the optic base cover 50, and has a height substantially the same as that of the holder receiving portion 51. The heat sensing element 70 is supported by a heat sensing element holder 71 and is connected at its end to a lead wire 72. The heat sensing element holder 71 has a insertion hole 71*a* through which the lead wire 72 or the heat sensing element 70 is inserted. Projections 71*b* formed on the outer peripheral portion of the heat sensing element holder 71 fit in the locating recesses 51*a* formed in the holder receiving portion 51.

Figure 15:
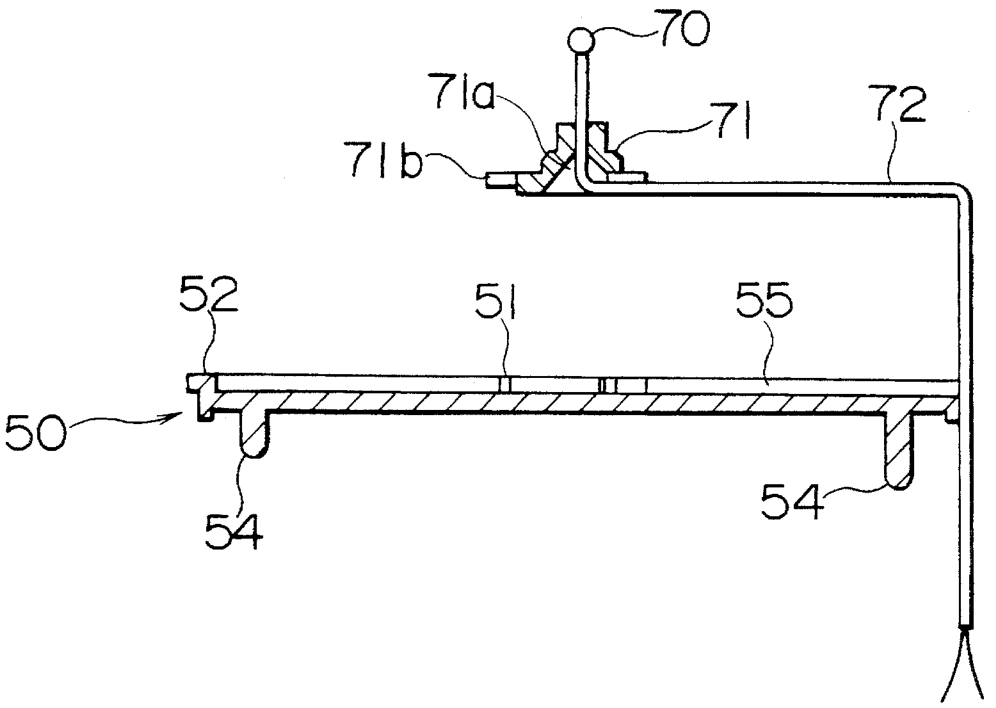
FIG. 15 is a sectional view taken along the line 15—15 of FIG. 14.

The heat sensing element 70 is secured to the optic base cover 50, after the cover 50 is mounted on the optic base 40. As will be seen from FIGS. 14 and 15, the lead wire 72 is inserted into the hole 71*a* in the heat sensing element holder 71 and, with the heat sensing element 70 held in a vertical posture, the lead wire 72 is bent so as to have an L-like shape. Then, the heat sensing element holder 71 is moved towards the holder receiving portion 51 of the optic base cover 50 so as to fit the projections 71*b* into the locating recesses 51*a*, while fixing the lead wire 72 in the lead wire guide groove 55. In this state, the heat sensing element holder 71 is correctly secured in the center of the optic base cover 50 by means of the projections 71*b* and the locating recesses 51*a*. The lead wire 72 is connected to the printed circuit board 10.

Figure 16:
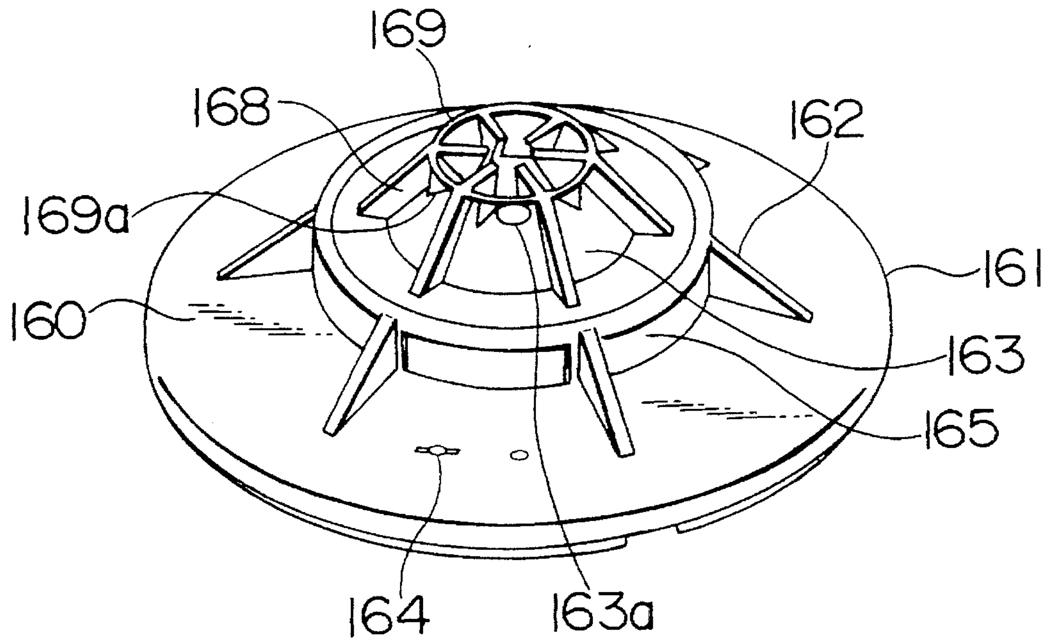
FIG. 16 is a perspective view of a protective cover used in the second embodiment.

The structure of the protective cover 160 will be described with reference to FIGS. 12 and 16. The protective cover 160 has a flange portion 161 and a top plate 163 connected to the flange portion 161 through connecting stays 162. A hole 163*a* for receiving the heat sensing element 70 is formed in the center of the top plate 163. The lower surface of the top plate 163 constitutes a pressing portion 163*b*. The flange portion 161 has a check bar insertion hole 164 and an indicator lamp hole 166 formed therein. A plurality of smoke inlet windows 165 are provided between the flange portion 161 and the top plate 163. A plurality of hooks for engagement with retaining portions 4 of the detector body 1 are provided on the outer peripheral edge of the flange portion 161. A protective ring 169 for protecting the heat sensing element is provided on the top plate 163 and is connected to the latter through supporting stays 168. Projections 169*a* are formed on the lower surface of the protective ring 169 so as to prevent a finger or the like from being inserted into the space where the heat sensing element is installed through gaps formed between adjacent supporting stays 168.

In assembling the detector, the protective cover 160 is moved towards the optic base cover 50 and the heat sensing element holder 71 is inserted into the hole 163*a* formed in the top plate 163 so that the heat sensing element holder 71 and the optic base cover 50 are pressed by the pressing portion 163*b* of the top plate 163, while bringing the hooks into engagement with the retaining portions 4 of the detector body 1. In this state, the heat sensing element holder 71 is securely fixed so that the heat sensing element 70 can be held at the predetermined position so as to stand upright from the center of the top plate 163. In addition, the lead wire 72 is concealed inside the connecting stays 162 of the protective cover 160, without being exposed to the exterior.

The second embodiment is also only illustrative of the present invention. For instance, the lower surface 40*a* of the optic base 40 may be provided with an annular ring which is adapted to be held in contact with the printed circuit board 10, instead of the lower surface 40*a* being in direct contact with the printed circuit board 10 as in the described second embodiment. Alternatively, a plurality of circumferentially spaced projections, e.g., three projections, may be provided instead of the annular ring. The check terminals 12 may be formed by a print pattern on the printed circuit board 10. The check bar insertion hole 64 formed in the protective cover 160 may be omitted. Mating blade members may be used as the conductive joints on the body 1.

The second embodiment offers an advantage over the known devices in that the assembling and disassembling of the detector can be done easily because of the reduced number of fixing screws. In addition, since the optic base is directly fixed to the printed circuit board by engaging means, it is possible to reduce the thickness of the detector while maintaining a sufficient height of the dark box. It is thus possible to reduce the thickness of the detector without any adverse effect on its performance.

In addition, the heat sensing element is always held at the design position, by means of the holder and the lead wire guide groove on the optic base cover, the holder holding the support member of the heat sensing element, and the lead wire guide groove receiving the lead wire, with the support member being pressed by the inner surface of the top plate of the protective cover.

What is claimed is:

1. A fire detector, comprising:

a detector body;

a printed circuit board fixed to said detector body, said printed circuit board having a plurality of insertion holes;

an optic base having a plurality of hooks at a lower end thereof and an annular labyrinth defined at an upper end thereof, said hooks being received in said insertion holes of said printed circuit board so as to fix said optic base to the upper surface of said printed circuit board;

an optic part holder mounted upon and directly contacting the upper surface of said printed circuit board, said optic base clamping said optic part holder to the upper surface of said printed circuit board to fix the optic part holder relative to said upper surface;

an optic base cover covering an upper end of said labyrinth of said optic base; and a light-emitting element and a light-receiving element arranged in a pair on said optic part holder.

2. A detector according to claim 9, wherein said optic base has a holder receiving portion which is open at its lower side and which receives said optic part holder.

3. A detector according to claim 2, wherein said optic part holder has a light-emitting-element receiving portion at one side thereof and receiving said light-emitting element, and a light-receiving element receiving portion at the other side thereof and receiving said light-receiving element.

4. A detector according to claim 3 and, further comprising a shield case supported by said optic part holder and shielding said light-receiving element received in said light-receiving element receiving portion.

5. A detector according to claim 4, wherein the light-emitting portion of said optic base has a contact portion against which said light-emitting element is pressed, and the light-receiving portion of said optic base has a contact portion against which said shield case is pressed.

6. A detector according to claim 3, wherein said optic part holder has insertion holes leading from said light-emitting element receiving portion and said light-receiving element receiving portion and opening at the lower surface of said holder, and further comprising lead terminals extending from said light-emitting element and said light-receiving element through the insertion holes of said optic part holder.

7. A detector according to claim 1, wherein said light-emitting element and said light-receiving element have optical axes which are on the same horizontal lie in a common plane.

8. A detector according to claim 7, wherein said optic base has a bottom surface and an annular wall extending along the periphery of said bottom surface, said labyrinth being defined on a portion of said bottom surface located radially inwardly of said annular wall of said optic base and having a height greater than that of said annular wall, said light-emitting element and said light-receiving element having optical axes extending substantially parallel to said bottom surface at substantially the same height as said annular wall.

9. A detector according to claim 9, and further comprising;

a heat sensing element having lead lines connected to said printed circuit board.

10. A detector according to claim 1, and further comprising a shield case covering said light-receiving element.

11. A detector according to claim 1, wherein said light-emitting element is a side-emission type of light-emitting, and wherein lead terminals extend entirely orthogonally to the optical axis of said light-emitting element.

12. A fire detector, comprising:

a printed circuit board;

an optic base fixed directly to said printed circuit board, said optic base having an annular labyrinth and an upperlight-interrupting wall;

an optic base cover which covers an upper end of said labyrinth of said optic base;

a light-emitting element and a light-receiving element arranged in a pair within said dark box;

an optic part holder holding said light-emitting element and said light-receiving element, said optic part holder having a lower light interrupting wall; and a shield case covering said light-receiving element;

the light interrupting walls and said optic base cooperating to form a dark box, and said light interrupting walls concealing said shield case from said dark box.

13. A detector according to claim 12, wherein said optic base has a holder receiving portion which is open at its lower end and which receives said optic part holder.

14. A detector according to claim 13, wherein said optic part holder has a light-emitting element receiving portion at one side thereof and receiving said light-emitting element, and a light-receiving element receiving portion at the other side thereof and receiving said light-receiving element, and said holder receiving portion of said optic base has a light-emitting portion accommodating said light-emitting element receiving portion, and a light-receiving portion accommodating said light-receiving element receiving portion of said optic part holder.

15. A detector according to claim 14, wherein said shield case is held by said optic part holder.

16. A detector according to claim 12, wherein said shield case is not painted.

17. A fire detector, comprising:

an optic base having an annular labyrinth and a holder receiving portion which is open at its lower end;

an optic part holder received in said holder receiving portion of said optic base and having a light-emitting element receiving portion and a light-receiving element receiving portion;

an optic base cover which covers an upper end of said labyrinth of said optic base:

a side-emission type of light-emitting element received in said light-emitting element receiving portion, said light-emitting element emitting light along an optical axis;

lead terminals which extend entirely orthogonally to the optical axis from said light-emitting element to ends of the terminals remote from said light-emitting element; and a light-receiving element received in said light-receiving element receiving portion.

18. A detector according to claim 17, wherein said optic part holder has an insertion hole leading from said light-emitting element receiving portion and open at the lower surface of said holder and receiving said lead terminals of said light-emitting element.

19. A detector according to claim 17, wherein said light-emitting element held by said optic part holder has a head portion which contacts the inner surface of said holder receiving portion of said optic base.

20. A heat-photoelectric combined type of fire detector, comprising:

a printed circuit board;

a light-emitting element and a light-receiving element;

an optic base fixed to said printed circuit board and supporting said light-emitting element and said light-receiving element;

an optic base cover which covers an upper end of said optic base;

a heat sensing element holder disposed on the upper surface of said optical base cover;

a heat sensing element held upright by said holder and having lead lines connected to said printed circuit board; and a protective cover having an insertion hole formed in an upper portion thereof and covering the upper side of said printed circuit board and said optic base cover, said heat sensing element projecting through said insertion hole, and said heat sensing element holder being clamped to the upper surface of said optic base cover by said protective cover.

21. A detector according to claim 20, wherein a holder receiving portion is formed in the central portion of the upper surface of said optic base cover and has a plurality of locating recesses, said heat sensing element holder having a plurality of projections received in said locating recesses and being received in said holder receiving portion.

22. A detector according to claim 21, further comprising a lead wire guide wall formed on the upper side of said optic base cover and extending from said holder receiving portion to the edge of said optic base cover.

23. A detector according to claim 22, wherein said optic base cover has a cylindrical protrusion formed on the peripheral portion of said optic base cover.

* * * * *

UNITED STATES PATENT AND TRADEMARK OFFICE
CERTIFICATE OF CORRECTION

PATENT NO. : 5,486,816

DATED : January 23, 1996

INVENTOR(S) : Yasuo ARIGA et al.

It is certified that error appears in the above-indentified patent and that said Letters Patent is hereby corrected as shown below:

Column 10, line 56, claim 2, line 1, change "9" to --1--.

Column 11, line 25, claim 9, line 1, change "9" to --1--.

Signed and Sealed this

Eleventh Day of February, 1997

Attest:

BRUCE LEHMAN

*Attesting Officer* *Commissioner of Patents and Trademarks*